C. P. McDONNELL.
STATION INDICATOR.
APPLICATION FILED APR. 15, 1911.

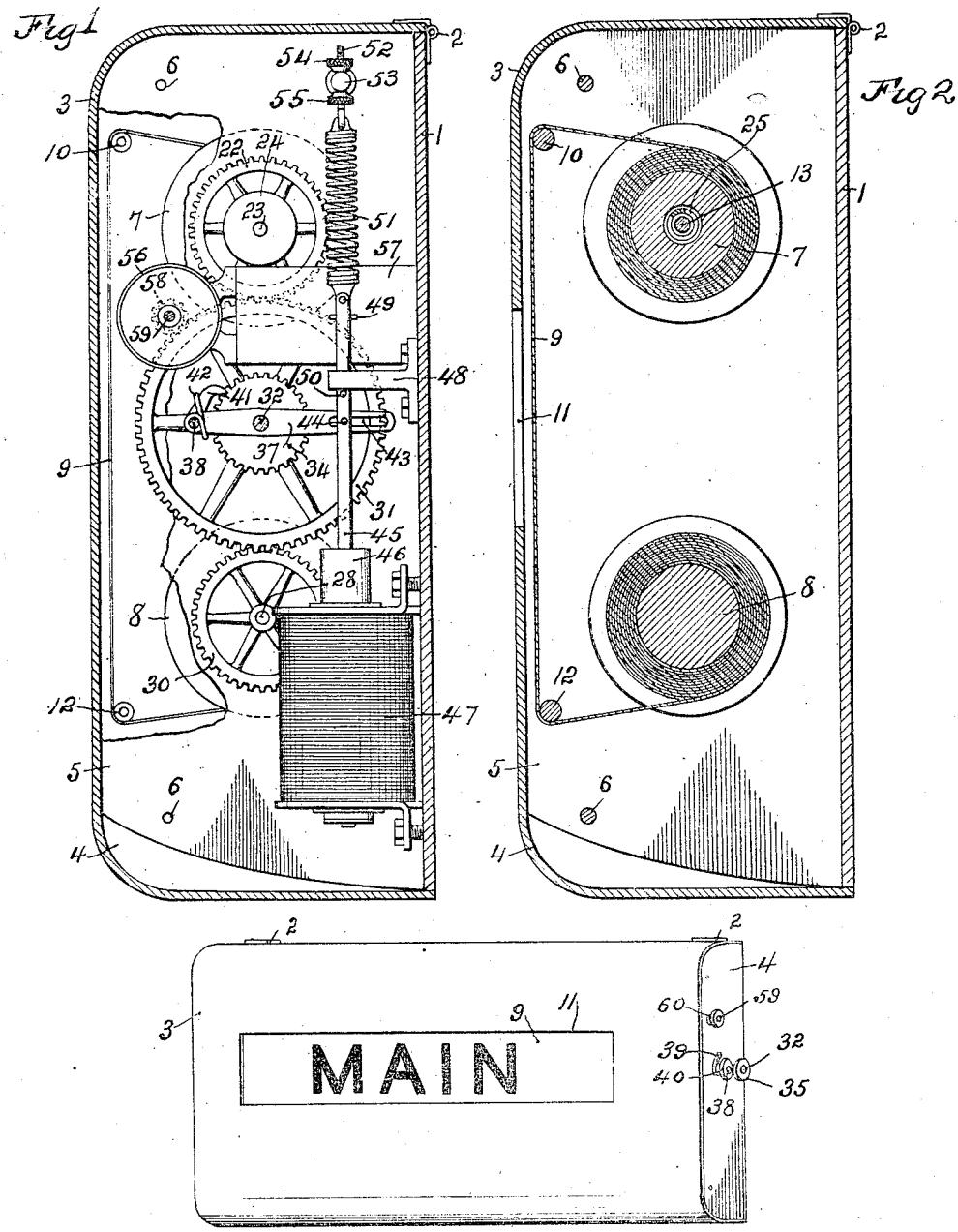

1,082,036.

Patented Dec. 23, 1913.
3 SHEETS—SHEET 2.

WITNESSES:
R. Hamilton
E. B. House

INVENTOR.
C. P. McDonnell
BY Warren D. House
His ATTORNEY.

C. P. McDONNELL.
STATION INDICATOR.
APPLICATION FILED APR. 15, 1912.
1,082,036.
Patented Dec. 23, 1913.
3 SHEETS—SHEET 3.
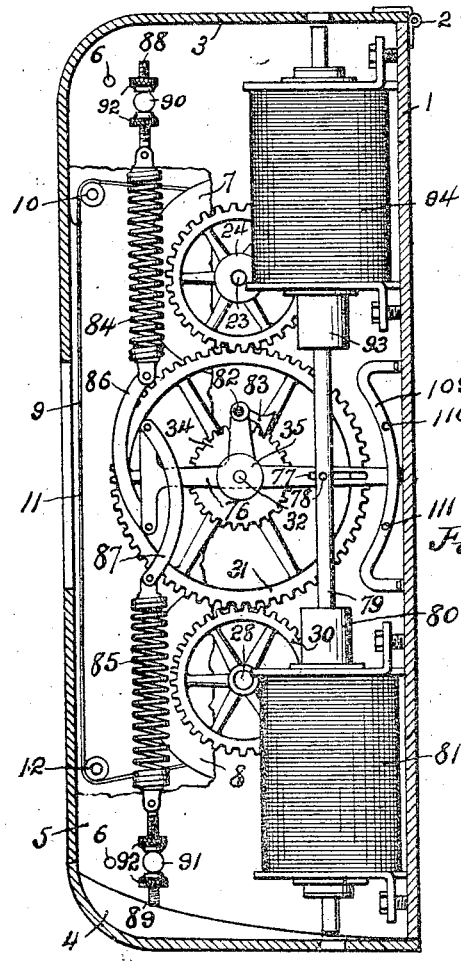
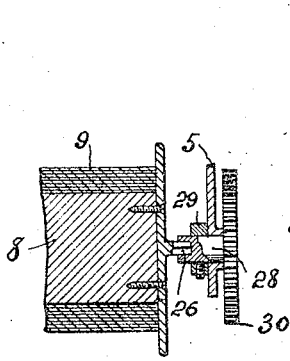
Fig 6
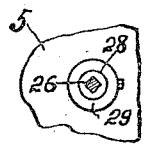
Fig 7
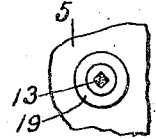
Fig 8
Fig 9
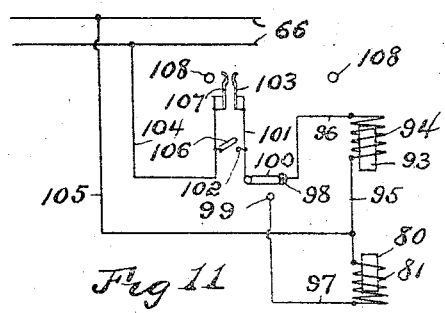
Fig 11
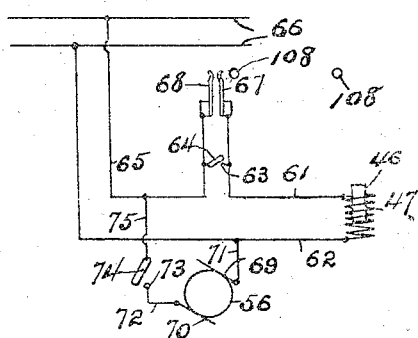
WITNESSES:
R. S. Hamilton
E. B. House
INVENTOR.
C. P. McDonnell
BY
Warren D. House
His ATTORNEY.

UNITED STATES PATENT OFFICE.

CORNELIUS P. McDONNELL, OF KANSAS CITY, MISSOURI.

STATION-INDICATOR.

1,082,036.   Specification of Letters Patent.   Patented Dec. 23, 1913.

Application filed April 15, 1912. Serial No. 690,743.

*To all whom it may concern:*

Be it known that I, CORNELIUS P. McDONNELL, a citizen of the United States, and a resident of Kansas City, in the county of Jackson and State of Missouri, have invented certain new and useful Improvements in Station-Indicators, of which the following is a specification.

My invention relates to improvements in station indicators.

The object of my invention is to provide a station indicator which is simple in construction, which is reliable and efficient in operation, which will occupy small space, and which is not liable to get out of order.

The novel features of my construction are hereinafter fully described and claimed.

Figure 4:
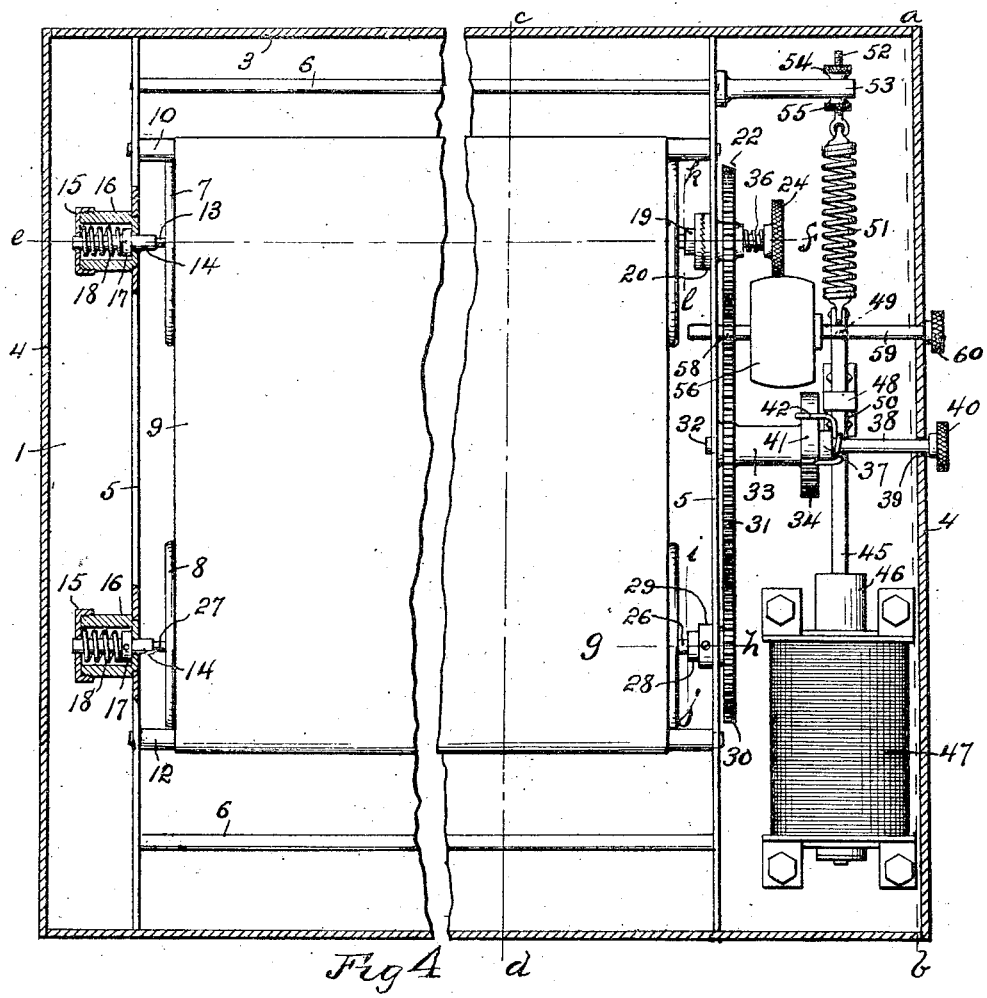
Figure 5:
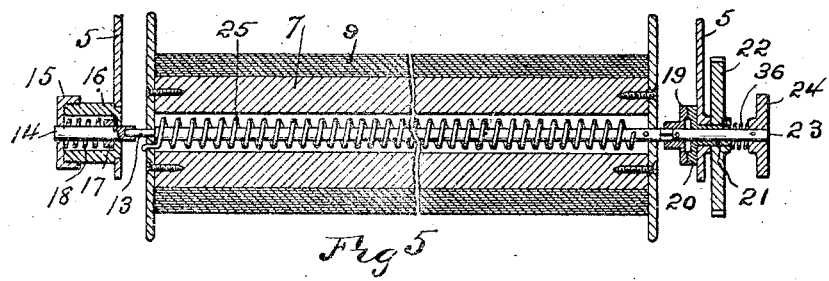

In the accompanying drawings which illustrate my invention, Figure 1 is a vertical section on the line *a—b* of Fig. 4, a portion being broken away, showing one form of my invention in which a motor is employed for rewinding the indicating band. Fig. 2 is a vertical section on the line *c—d* of Fig. 4. Fig. 3 is a perspective view, reduced, of the machine. Fig. 4 is a front view of the machine shown in the preceding figures, a portion being shown in vertical section and a portion in elevation, a part of the central portion of the machine being broken away. Fig. 5 is a horizontal section on the line *e—f* of Fig. 4. Fig. 6 is a horizontal section on the line *g—h* of Fig. 4. Fig. 7 is a vertical section on the line *i—j* of Fig. 4. Fig. 8 is a vertical section on the line *k—l* of Fig. 4. Fig. 9 is a diagrammatic view of the circuit employed in the form shown in the preceding views. Fig. 10 is a side view, partly in elevation and partly in vertical section, and partly broken away of a modified form of my invention which may be employed on cars which run back and forth on the same track or route. Fig. 11 is a view of the circuit employed in the form shown in Fig. 10.

Similar reference characters designate similar parts.

The indicator is provided with a casing which may be of any desired size and shape, but which is preferably provided with a back or base plate 1, to which is pivoted by hinges 2 a rectangular cover 3, and which has vertical forwardly extending sides 4. Within the casing and secured at their rear edges are two vertical forwardly extending plates 5, which may be connected to each other by tie rods 6. Between the plates 5 are rotatively mounted one above the other two horizontal parallel rollers 7 and 8 to the peripheries of which are respectively secured the ends of an indicating band, of any suitable flexible material, designated by 9, and which passes from the roller 7 forwardly to and over a horizontal roller 10 having its ends pivotally mounted in the plates 5, and located above an observation opening 11 provided in the cover 3. The band 9 passes downwardly across the opening 11 to and around a roller 12 disposed parallel with the roller 10 and also having its ends pivoted in the plates 5. From the roller 12 the band 9 passes to the roller 8 to the periphery of which it is secured. As shown in Fig. 2, the band 9 is preferably adapted to wind on one roller as it unwinds from the other, the rollers 7 and 8 being preferably driven in like directions simultaneously by mechanism hereinafter described.

The upper roller 7 is rotatively mounted on an axial rotary member comprising a shaft 13, as shown in Fig. 5. One end of the shaft 13 is pivoted in one end of a horizontal longitudinally slidable pin 14 which extends through a hole in the adjacent plate 5 and is slidably mounted in a central hole provided in a screw cap 15 fitted on the outer threaded end of a cup 16, the inner end of which is secured in a hole provided in the adjacent plate 5, and having a central hole in which is slidably mounted the pin 14. Secured to the pin 14 within the cup 16 is a collar 17 against which bears one end of a coil spring 18, the other end of which bears against the cap 15. The other end of the shaft 13 is squared and fitted detachably in a square hole provided in a clutch or ratchet member 19 having ratchet teeth 20 normally engaging similar teeth provided in another clutch or ratchet member 20, which has an axial extension 21 which extends through the adjacent plate 5 and has rigidly secured to it a pinion 22. The member 20 is provided with an axial hole in which is slidably mounted a pin 23 which is rigidly secured to the member 19, and has secured to its outer end a button 24 by which the pin 23 may be forced inwardly so as to release the clutch or ratchet member 19 from the member 20, for the purpose of changing the initial tension of a coil spring 25 which encircles the shaft 13 and has one end secured to said shaft, the other end being secured to the roller 7. The spring 18, through the pin 14 normally retains the squared end of the shaft 13 in the hole in the member 19. By moving the roller 7 to the left, as viewed in Fig. 5, the shaft 13 may be detached from the member 19 and then detached from the pin 14, when it is desired to remove the roller 7. The lower roller 8 is provided at opposite ends with axial trunnions 26 and 27, the left trunnion 27, as viewed in Fig. 4, being pivoted in a central hole provided in one end of a pin 14, which, like the pin 14 already described, extends through an axial hole in a cup 16 secured in a hole in the adjacent plate 5 below the cup 15 before described. The lower pin 14 is also slidable in a cap 15 mounted on the lower cup 16 and has secured to it a collar 17 against which bears one end of a coil spring 18, the other end of which bears against the adjacent cap 15. The other trunnion 26 is squared, as shown in Fig. 6, and is removably fitted in a square hole provided in a rotary member comprising a horizontal pin 28, which is pivotally mounted in a hole in the adjacent plate 5. Secured to the pin 28 at the inner side of the plate 5 is a collar 29. A pinion 30 is secured to the pin 28 at the other side of the plate 5.

A spur gear wheel 31, which meshes with the pinion 30 and the pinion 22, is rigidly mounted on a horizontal shaft 32, which is pivotally mounted in the adjacent plate 5 and extension 4 of the base 1. Secured rigidly to the hub 33 of the gear wheel 31 is a ratchet wheel 34. The shaft 32 outside the casing has secured to it a button 35 by which the gear wheel 31 may be turned, when it is desired to turn the pinions 30 and 22 to adjust the rollers 7 and 8 so that the indicating band 9 shall display the proper street or station names at the opening 11 in the cover 3, it being understood that on the outer side of the indicating band 9 are inscribed the names of the streets or stations in the order in which they are to appear at the observation opening 11. If desired, a coil spring 36 may encircle the pin 23 and have one end bearing against the button 24, and the other end bearing against the outer end of the hub of the pinion 22, for the purpose of normally forcing the pin 23 outwardly.

The foregoing description applies to both forms of my invention. Referring now particularly to the form shown in the first nine figures of the drawings, 37 designates a lever pivoted on the shaft 32 and having pivoted to it a horizontal pin 38 which extends through a curved slot 39 in the adjacent side 4 of the casing, and has secured to its outer end a button 40 by which the pin 38 may be turned. A pawl 41 is secured to the pin 38 and releasably engages the teeth of the ratchet wheel 34. A spring 42 secured to the lever 37 normally forces the pawl 41 into engagement with the ratchet wheel 34. The lever 37 has a longitudinal slot 43 in which is slidably mounted a horizontal pin 44, which is secured to a vertical rod 45, the lower end of which is secured to a vertically movable core 46 of a solenoid having a helix 47. The rod 45 is slidably mounted in a vertical hole provided in a bracket 48, which is secured to the base plate 1. Pins 49 and 50 projecting from the rod 45, and disposed above and below the bracket 48 limit the vertical movement of the rod 45. The upper end of the rod 45 is secured to the lower end of a coil spring 51, the upper end of which is secured to an adjusting screw 52, which extends through a post 53 secured to and extending horizontally from the adjacent plate 5. Two nuts 54 and 55 located above and below the post 53 and mounted on the screw 52, serve as a means for securing the upper end of the spring 51 in an adjustable manner.

When the helix 47 is energized the core 46 will be drawn downwardly against the pull of the spring 51 and turn the gear wheel 31 through the intermediacy of the rod 45, pin 44, lever 37, pawl 41 and ratchet 34, the gear wheel 31 being turned in a clockwise direction, and thereby turning the rollers 7 and 8, through the mechanism already described, in directions such that the indicating band 9 will be wound on the roller 8 and withdrawn from the roller 7. The names of the streets or stations on the band 9 are arranged so that with one pull downward of the core 46 of the solenoid, the band will be advanced so as to display a new name at the opening 11. When the circuit in which the helix 47 is opened, the spring 51 will retract the rod 45, core 46 and lever 37, thereby slipping the pawl 41 over the teeth of the ratchet wheel 34, the lower pin 50 limiting the upward movement of the rod 45.

At the starting end of the line, the band 9 is wound to its limit on the roller 7. At this time an initial tension remains in the spring 25, this tension being imparted as already described, by forcing inwardly the pin 23 so as to disengage the ratchet or clutch members 19 and 20 from each other, and then turning the pin 23 until sufficient initial tension has been given to the coil spring 25.

The rollers 7 and 8 are of like diameters, as are the pinions 30 and 22, therefore, as the rollers 7 and 8 are turned through the intervention of the solenoid core 46 to wind the band 9 on the roller 8, the tension of the spring 25 will weaken, owing to there being more of the band on the roller 7, until one half the band is wound on the roller 8, at this time the tension of the spring 25 will increase until the band is unwound from the roller 7. Thus, when an equal amount of band is on each of the rollers 7 and 8, the tension of the spring 25 will be the least. The initial tension imparted to the spring 25 should be sufficient so that there will be tension enough to keep the band 9 taut when the tension is the least.

At the end of a round trip it will be necessary to wind the band 9 back upon the roller 7. To effect this I provide a motor 56, which is supported on a bracket 57 secured to the base plate 1. Secured to the armature shaft of the motor 56 is a pinion 58. Said armature shaft, which is designated by 59, is horizontally slidably mounted in the adjacent plate 5 and side 4 of the casing. A button 60 is secured to the outer end of the said shaft, so that by pulling outwardly thereon the shaft 59 may be slid to a position in which the pinion 58 will be free from the gear wheel 31 with which it must be engaged when it is desired to rewind the band on the roller 7. When this is to be done, the shaft 59 is moved so as to engage the pinion 58 with the gear wheel 31. The button 40 is then turned so as to disengage the pawl 41 from the ratchet wheel 34. Then the circuit containing the motor 56 is closed and the motor is thus placed in operation for the turning of the roller 7 so as to wind thereon the band 9, the direction of rotation of the armature shaft 59 being such as to effect this result. After the band 9 has been wound on the roller 7, the motor circuit is opened and the shaft 59 pulled so as to release the wheel 31 from the pinion 58. The pawl 41 is then permitted to again engage the ratchet wheel 34.

Referring to Fig. 9, 61 and 62 designate two conductors respectively connected to the ends of the helix 47 of the solenoid shown in Figs. 1 and 4. The conductor 61 is connected to a contact 63 adapted to close the circuit through a switch lever or contact member 64, which is connected to a conductor 65, which in turn is connected to one of the conductors 66 which form part of the circuit from which the current is obtained. The other conductor 66 is connected to the conductor 62. By closing the circuit through the switch lever 64 and contact member 63, the helix may be energized, thereby operating the indicator to display the next station or street name at the opening 11, as has already been described. The conductor or motorman of the car may operate the switch lever 64 for this purpose, or the circuit may be closed automatically at the proper time and place by means of any fixed device 108, Fig. 9, which is disposed so as to strike one or the other of two spring contacts 67 and 68 and move it against the adjacent contact. The contacts referred to are respectively connected to the conductors 61 and 65.

For operating the motor 56, its brushes 69 and 70 are respectively connected by two conductors 71 and 72 to the conductor 62 and a contact 73. A switch member or lever 74 is connected by a conductor 75 with the conductor 65, and is normally separated from but is adapted to be moved into contact with the contact 73. When this is done, the circuit being open at the contacts 67 and 68 and lever 64, the circuit will be closed through the motor 56, the path of the current being from one conductor 66 through conductors 65 and 75, lever 74, contact 73, conductor 72, brush 70, motor 56, conductors 71 and 62 to the other conductor 66. By placing the lever 74 in contact with the contact 73, the motor 56 may be operated to rewind the band 9 on the roller 7, in the manner already described.

Referring to Fig. 10, a lever 76 is pivoted, like the lever 37 on the shaft 32, and is likewise provided with a slot 77 in which is located a horizontal pin 78 which is secured to a rod 79 having its lower end secured to a vertically movable core 80 movable vertically in the helix 81 of a solenoid, which is secured to the base plate 1. The lever 76 has pivoted to it a horizontal pin 82, which corresponds to the pin 38 of the other form of my invention, and which has a pawl 83 secured to it and adapted to be swung to two positions for moving the ratchet wheel 34 in opposite directions as the rod 79 is pulled upwardly and downwardly from the intermediate position shown in Fig. 10. To normally hold the lever 76 in the middle position, shown in Fig. 10, two coil springs 84 and 85 are disposed respectively vertically above and below the lever 76 to which the springs are respectively connected by two bars 86 and 87 one set of ends of which are pivoted to the lever 76 and the other set of ends of which are respectively secured to one set of ends of the springs 84 and 85. The other set of ends of the springs 84 and 85 are respectively secured to two vertical screws 88 and 89 which are respectively vertically slidable in holes provided in two horizontal posts 90 and 91, which are secured to the adjacent plate 5. Each screw 88 and 89 is provided at opposite sides of the post through which it extends with nuts 92 by which the screw may be adjusted to change the tension of the spring to which it is connected. The upper end of the rod 79 is secured to the lower end of a core 93 which is vertically movable in a helix 94 secured to the base 1.

When it is desired to wind the indicating band 9 onto the roller 8 from the roller 7, the pawl 83 is disposed as shown in Fig. 10 and the helix 81 is successively energized, thereby successively moving the pawl 83 and ratchet 84 clockwise, through the intermediacy of the core 80, rod 79, pin 78, lever 76, and pin 82, and stretching the spring 85, which when the helix 81 is deenergized retracts the lever 76 to the middle position and retracts the pawl 83 over the teeth of the ratchet wheel 34.

The step by step movement imparted to the ratchet wheel, is transmitted to the band 9, in the manner already described. When it is desired to rewind the indicating band 9 upon the roller 7 in a step by step manner, so as to display the station or street names in the reverse order, the helix 94 is successively energized, thereby causing the core 93 to be pulled upwardly, and thus drawing upwardly the right end of the lever 76, as viewed in Fig. 10. Before this is done, the pin 82 is turned the reverse of clockwise so as to engage the other side of the pawl 83 with the ratchet wheel 34. The successive energizing of the helix 94 will thus cause the lever 76 to be swung so that the pawl 83 will turn the ratchet wheel 34 step by step in a direction the reverse of clockwise. This movement of the ratchet wheel 34 will cause the indicating band 9 to be wound by a step by step movement upon the roller 7, and will cause the names on the band to be presented at the opening 11 in an order the reverse of that in which they are presented when the band is wound on the roller 8.

In Fig. 11 is shown a circuit which may be employed in connection with the form shown in Fig. 10. One end of the helix 94 is connected with one end of the helix 81 by a conductor 95. The other ends of said helices are respectively connected by conductors 96 and 97 with two contacts 98 and 99 each of which is adapted to be connected with a switch member or lever 100, which is connected to a conductor 101. The conductor 101 is connected to a contact 102 and a spring contact 103. A conductor 104 is connected to one of the supply conductors 66 the other one of which is connected by a conductor 105 with the conductor 95. Connected to the conductor 104 is a switch member or lever 106 which is adapted to be connected to the contact 102. A spring contact 107 is also connected to the conductor 104 and is adapted to make contact with the spring contact 103. The spring contacts 103 and 107 may be engaged with each other, as has been described with reference to the spring contacts 67 and 68, by some devices fixed at the proper places and in the proper positions on the route of the car, such devices being designated in Fig. 11 by 108.

In operating the form shown in Fig. 10, the lever 100 is placed in contact with the contact 98, as shown in Fig. 11. If now either the lever 106 is made to contact with the contact 102, or the spring contacts 103 and 107 are brought together, the path of the current will be from one conductor 66 through conductor 104, either lever 106 and contact 102 or contacts 103 and 107, as the case may be, conductor 101, lever 100, contact 98, conductor 96, helix 94, conductors 95 and 105 to the other conductor 66. The helix 94 being energized, the core 93 will be pulled upwardly, thereby swinging the lever 76 the reverse of clockwise and causing the pawl 83, which has been properly positioned, to also turn the ratchet wheel 34 the reverse of clockwise, and thereby turning the roller 7, by the mechanism already described so as to wind thereon the indicating band 9. After the band has been wound on the roller 7, and the end of the track has been reached, the pin 82 is turned so as to reverse the position of the pawl 83 with reference to the ratchet wheel 34. The lever 100 is then swung into contact with the contact 99. Either the lever 106 and contact 102 or the contacts 103 and 107 are then successively brought together, and the current will pass by the path already described from one of the conductors 66 to the lever 100 after which, the current will pass through contact 99, conductor 97, helix 81 and conductors 95 and 105 to the other conductor 66. The helix 81 being energized will pull downwardly the core 80, thus swinging the lever 76 in a clockwise direction, and through the pawl 83 rotating the ratchet wheel 34 in a clockwise direction, thus, through the mechanism described, turning the roller 8 so as to wind the indicating band step by step thereon. Thus by swinging the pawl 83 to the proper positions, and adjusting the lever 100 to the proper contact 98 or 99, and, at the proper time closing the circuit through the lever 106 or the contacts 103 and 107, the indicating band 9 may be made to properly display the street or station names when the car is moving in either direction over the same route.

By reason of the rotary members 13 and 28 having a positive turning movement of like extent imparted to them simultaneously, through the intermediacy of the gear wheel 31 and pinions 22 and 30, and by reason of the yielding spring connection between the member 13 and the roller 7, a very simple and efficient means is provided for accurately driving the indicating band 9, and a structure of compact form afforded.

For limiting the vertical swing of the lever 76, a vertical curved bar 109 may be secured to the inner side of the base plate 1, the bar above and below said lever having projecting in the path of said lever stop pins 110 and 111, which respectively limit the upward and downward swing of the right end of the lever 76, as shown in Fig. 10.

I do not limit my invention to the structures shown and described, as modifications, other than what is shown and described, within the scope of the appended claims, may be made without departing from the spirit of my invention.

Having thus described my invention, what I claim and desire to secure by Letters Patent, is:—

1. In a station indicator, two rollers, an indicating band secured to said rollers and adapted to wind on one roller as it unwinds from the other, two rotary members one of which is rotative with one of said rollers, a coil spring secured to the other rotary member and to the other of said rollers, gearing connected to one of said rotary members and including a ratchet device connected with the other rotary member which is connected to said spring and by which the last named rotary member may be turned without turning the other rotary member, and means for driving said gearing.

2. In a station indicator, two rollers, an indicating band secured to the rollers and adapted to wind on one roller as it unwinds from the other, two rotary members one of which is rotative with one of said rollers, a coil spring secured to the other roller and to the other rotary member, two pinions, two ratchet members secured one to the rotary member which is secured to the spring, the other being secured to one of said pinions, the other pinion being rotative with the rotary member which is not secured to the spring, and means for simultaneously driving said pinions.

3. In a station indicator, two rollers, an indicating band secured to the rollers and adapted to wind on one roller as it unwinds from the other, two rotary members one of which is rotative with one of said rollers, a coil spring secured at one end to the other rotary member and at the other end to the other roller, two ratchet members engaging with each other one ratchet member being rotative with the rotary member to which the spring is secured, two pinions one of which is secured to the other ratchet member and the other of which is secured to the rotary member which is not secured to the spring, a gear wheel meshing with said pinions, and means for driving said gear wheel.

In testimony whereof I have signed my name to this specification in the presence of two subscribing witnesses.

CORNELIUS P. McDONNELL.

Witnesses:
 WARREN D. HOUSE,
 E. B. HOUSE.